(12) United States Patent
Li

(10) Patent No.: US 12,266,168 B2
(45) Date of Patent: Apr. 1, 2025

(54) METHOD FOR CONTROLLING LENS MODULE, AERIAL VEHICLE, AND AIRCRAFT SYSTEM

(71) Applicant: AUTEL ROBOTICS CO., LTD., Guangdong (CN)

(72) Inventor: Zhaozao Li, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 395 days.

(21) Appl. No.: 17/661,756

(22) Filed: May 3, 2022

(65) Prior Publication Data

US 2022/0262110 A1 Aug. 18, 2022

Related U.S. Application Data

(63) Continuation of application No. PCT/CN2020/124053, filed on Oct. 27, 2020.

(30) Foreign Application Priority Data

Nov. 5, 2019 (CN) .......................... 201911071822.8

(51) Int. Cl.
*G06V 20/17* (2022.01)
*B64D 43/00* (2006.01)
(Continued)

(52) U.S. Cl.
CPC ............. *G06V 20/17* (2022.01); *B64D 43/00* (2013.01); *G08G 5/003* (2013.01); *B64U 10/14* (2023.01); *B64U 20/87* (2023.01); *B64U 2101/30* (2023.01)

(58) Field of Classification Search
CPC ........ G06V 20/17; B64D 43/00; G08G 5/003; B64U 20/87; B64U 10/14; B64U 2101/30
(Continued)

(56) References Cited

U.S. PATENT DOCUMENTS

2017/0359515 A1\* 12/2017 Harris .................... H04N 23/90
2019/0248487 A1  8/2019 Holtz et al.
2020/0130862 A1\* 4/2020 Honjo ...................... G05D 1/04

FOREIGN PATENT DOCUMENTS

CN  107087042 A  8/2017
CN  107580087 A  1/2018
(Continued)

OTHER PUBLICATIONS

PCT International Search Report.

*Primary Examiner* — Quang N Vo
(74) *Attorney, Agent, or Firm* — Frank Gao, Esq.

(57) ABSTRACT

Embodiments are a method for controlling a lens module, an aerial vehicle, and an aircraft system, wherein the method for controlling a lens module is applied to the aerial vehicle, the aerial vehicle is provided with a tripod head to mount the lens module thereon, and the method includes: acquiring model data of the lens module if the lens module is adapted to the aerial vehicle; determining a lens model of the lens module according to the model data; identifying the lens module corresponding to the lens model to control the lens module. Following the method, the model data of the lens module is acquired, the lens module adapted to the corresponding aerial vehicle is identified, and a control program is called to control the lens module. Therefore, the aerial vehicle can identify and enable drive control over a new lens module.

18 Claims, 5 Drawing Sheets

(51) Int. Cl.
*G08G 5/00* (2006.01)
*B64U 10/14* (2023.01)
*B64U 20/87* (2023.01)
*B64U 101/30* (2023.01)

(58) Field of Classification Search
USPC .......................................................... 382/104
See application file for complete search history.

(56) References Cited

FOREIGN PATENT DOCUMENTS

| | | |
|---|---|---|
| CN | 207367004 U | 5/2018 |
| CN | 110347171 A | 10/2019 |
| CN | 110963064 A | 4/2020 |

\* cited by examiner

METHOD FOR CONTROLLING LENS MODULE, AERIAL VEHICLE, AND AIRCRAFT SYSTEM

CROSS REFERENCE

The present application is a continuation of International Patent Application No. PCT/CN2020/124053 filed on Oct. 27, 2020, which claims priority to Chinese Patent Application No. 201911071822.8 filed on Nov. 5, 2019, both of which are incorporated herein by reference in their entireties.

BACKGROUND

Technical Field

The present disclosure relates to the technical field of enabling drive control over a lens module, more particularly, to a method for controlling a lens module, an aerial vehicle, and an aircraft system.

Related Art

With the development of unmanned aerial vehicles (UAV), UAVs have been applied in a wide range of fields, and in most of them, photographing with a UAV, also called aerial photography, is quite common.

Generally, aerial vehicles have to be configured with various lens modules for different requirements for photographing of users, which brings additional costs to users. As a result, it is inevitable to frequently change the lens module of a UAV for different requirements of users. However, it is challenging to enable drive control over the lens module by the UAV after the lens module is changed, and those skilled in the art have engaged in this subject of intense interest.

SUMMARY

It is a major object of the present disclosure to provide a method and apparatus for controlling a lens module, an aerial vehicle, an aircraft system, and a medium.

To achieve the above object, the present disclosure provides a method for controlling a lens module, which is applied to an aerial vehicle, the aerial vehicle being provided with a tripod head to mount a lens module thereon, the method including:
  acquiring model data of the lens module if the lens module is adapted to the aerial vehicle;
  determining a lens model of the lens module according to the model data; and
  identifying the lens module corresponding to the lens model to control the lens module.
Preferably, the acquiring model data of the lens module includes:
  detecting whether a communication interface communicating with the lens module is turned on;
  sending a model data request to the lens module corresponding to the communication interface when the communication interface is turned on; and
  receiving the model data sent by the lens module in response to the model data request.
Preferably, the method further includes:
  sending a prompt instruction to a terminal device communicatively connected to the aerial vehicle when the communication interface is not turned on so that the terminal device generates a corresponding prompt message.
Preferably, the prompt message includes at least one of a voice prompt message, a text prompt message, and a picture prompt message.
Preferably, the acquiring model data of the lens module includes:
  receiving model information sent by the lens module; and
  root-parsing the model information to obtain the model data of the lens module.
Preferably, the identifying the lens module corresponding to the lens model to control the lens module includes:
  identifying the corresponding lens module according to the lens model, thereby calling a driving control program corresponding to the lens module to control the lens module.

Further, the present disclosure provides an apparatus for controlling a lens module, which is applied to an aerial vehicle, the aerial vehicle being provided with a tripod head to mount the lens module thereon, the apparatus including:
  a data acquiring module for acquiring model data of the lens module if the lens module is adapted to the aerial vehicle;
  a model determining module for determining a lens model of the lens module according to the model data; and
  a lens controlling module for identifying the lens module corresponding to the lens model to control the lens module.

Further, the present disclosure provides an aerial vehicle, the aerial vehicle including a body, arms connected to the body, a power apparatus provided on the arm, and a tripod head connected to the body, wherein the tripod head is configured to mount a lens module thereon, and the aerial vehicle further includes:
  a memory and a processor;
  wherein the memory is configured to store a computer-executable control program;
  the processor is configured to call the computer-executable control program to perform the aforementioned method for controlling.

Further, the present disclosure provides an aircraft system, the aircraft system including an aerial vehicle and a terminal device communicatively connected to the aerial vehicle, the aerial vehicle including a body, arms connected to the body, a power apparatus provided on the arm, and a tripod head connected to the body, wherein the tripod head is configured to mount a lens module thereon, and the aerial vehicle further includes:
  a memory and a processor;
  wherein the memory is configured to store a computer-executable control program;
  the processor is configured to call the computer-executable control program to perform the aforementioned method for controlling.

The present disclosure also provides a storage medium, wherein the storage medium stores a computer-executable control program, and the processor calls the computer-executable control program to perform the aforementioned method for controlling.

The present disclosure is more advantageous than prior art in that the method for controlling a lens module herein is applied to an aerial vehicle, wherein the aerial vehicle is provided with a tripod head to mount the lens module thereon, and the method for controlling includes: acquiring model data of the lens module if the lens module is adapted to the aerial vehicle; determining a lens model of the lens module according to the model data; identifying the lens module corresponding to the lens model to control the lens module.

In other words, following the method for controlling herein, the model data of the lens module is acquired, the lens module adapted to the corresponding aerial vehicle is identified according to the model data, hence the control program corresponding to the lens module is called to control the lens module. Therefore, the aerial vehicle can identify a new lens module and enable drive control over the same when the lens module is changed.

DETAILED DESCRIPTION

Figure 1:
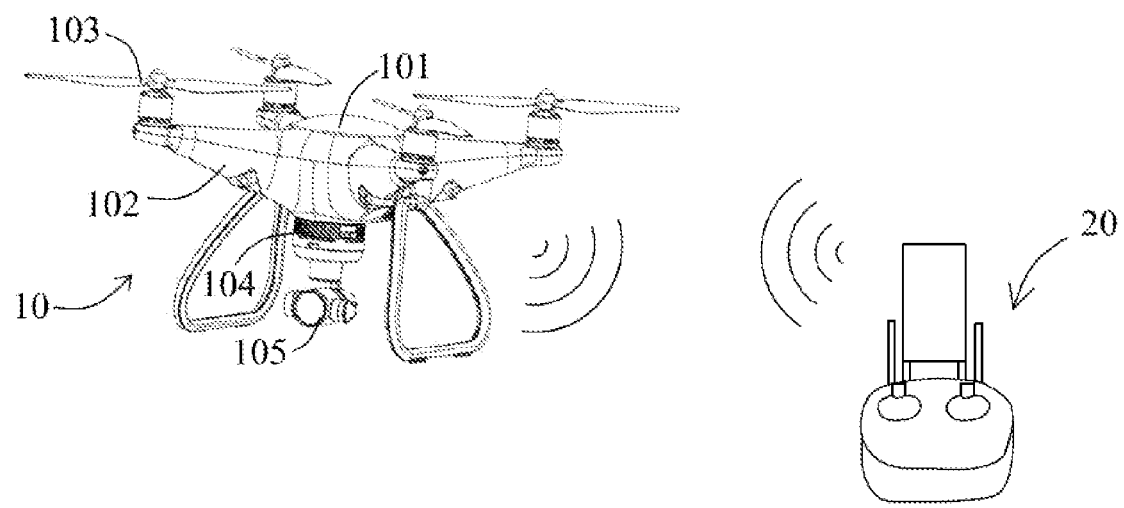
FIG. 1 is a schematic diagram showing a structure of an aircraft system according to an embodiment of the present disclosure.

To make the object, technical solutions and advantages of the present disclosure clearer, the present disclosure will be further described in detail below with reference to the accompanying drawings and embodiments. It should be understood that the specific embodiments described herein serve only to explain the present disclosure, but not to limit the present disclosure. All other embodiments obtained by those of ordinary skill in the art based on the embodiments of the present disclosure without inventive efforts shall fall within the scope of the present disclosure.

Terms like "first", "second", "third", and "fourth" (if any) in the description and claims of the present disclosure and the above drawings serve to distinguish one from another of similar objects, instead of defining a specific order or sequence. It is to be understood that terms like these can be interchanged as appropriate so that the embodiments described herein can be enforced in sequences other than those illustrated or described herein. Furthermore, terms like "comprise" and "have" and any variations thereof are intended to indicate non-exclusive inclusion, for example, a process, method, system, product or device including a series of steps or units is not necessarily limited to those expressly listed, rather, it may include other steps or units not expressly listed or inherent to the process, method, product or device.

It should be noted that the description involving "first", "second", and the like in the present disclosure serves only for the illustrative purpose, and should not be construed as indicating or implying a relative importance or the number of indicated technical features. Therefore, features defined with "first" and "second" may expressly or implicitly include at least one of these features. In addition, the technical solutions in the various embodiments can be combined, but must be enforceable by those of ordinary skill in the art. If a combination of technical solutions is contradictory or not enforceable, the combination of such technical solutions shall be considered not to exist and not fall within the scope claimed by the present disclosure.

The present disclosure provides a method and apparatus for controlling a lens module, an aerial vehicle, an aircraft system, and a storage medium, wherein the method for controlling a lens module is applied to the aerial vehicle, the aerial vehicle is provided with a tripod head to mount a lens module thereon, and the method for controlling includes: acquiring model data of the lens module if the lens module is adapted to the aerial vehicle; determining a lens model of the lens module according to the model data; identifying the lens module corresponding to the lens model to control the lens module.

Following the method for controlling herein, the model data of the lens module is acquired, the lens module adapted to the corresponding aerial vehicle is identified according to the model data, hence the control program corresponding to the lens module is called to control the lens module. Therefore, the aerial vehicle can identify a new lens module and enable drive control over the same when the lens module is changed.

Figure 2:
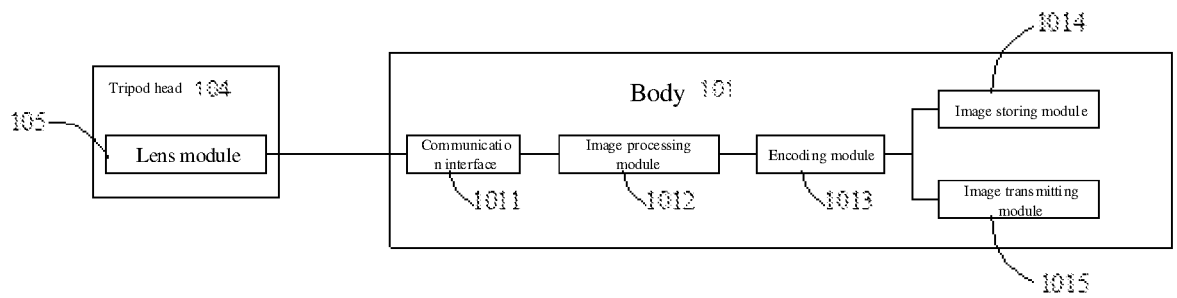
FIG. 2 is a schematic block diagram of a communication connection between a lens module mounted on a tripod head of an aerial vehicle in an aircraft system and the aerial vehicle.
Figure 3:
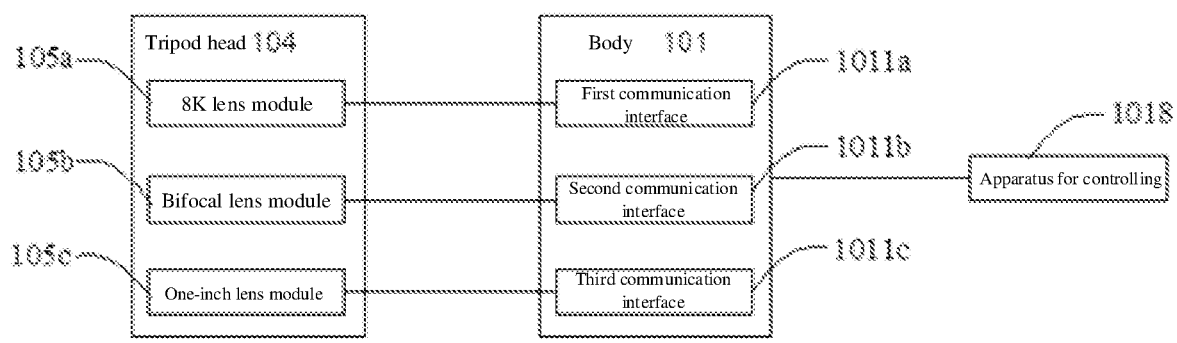
FIG. 3 is a schematic block diagram of a lens module communicatively connected to an aerial vehicle via a plurality of communication interfaces according to an embodiment of the present disclosure.

Referring to FIGS. 1 to 3, FIG. 1 shows an aircraft system 100 according to the present disclosure, wherein the aircraft system includes an aerial vehicle 10 and a terminal device 20 communicatively connected to the aerial vehicle 10.

Herein, the terminal device 20 includes, for example, a smartphone, a tablet computer, a computer, and a remote controller. A user may interact with the terminal device 20 via one or more input devices of any suitable type, such as a mouse, a button, and a touch screen. Between the aerial vehicle 10 and the terminal device 20, a communicative connection can be established by a wireless communication module, such as a signal receiver and a signal transmitter, provided inside the aerial vehicle 10 and the terminal device 20, respectively, to upload or issue data/instructions.

The aerial vehicle 10 can be a rotor aerial vehicle, such as a quad-rotor aerial vehicle, a six-rotor aerial vehicle, or a fixed-wing aerial vehicle. The terminal device 20 is configured to send a control instruction to the aerial vehicle 10 to control the aerial vehicle 10, and the terminal device 20 can be a remote controller or a smartphone.

The aerial vehicle 10 includes a body 101, arms 102 connected to the body 101, a power apparatus 103 provided in the arm 102, a tripod head 104 connected to the body 101, and a control system (not shown) provided in the body 101.

The tripod head 104 is configured to mount the lens module 105 thereon, and the lens module 105 can be a 1080P, 4K or 8K high definition lens module or an infrared lens module.

The power apparatus 103 is configured to provide thrust and lifting forces for the aerial vehicle 10 to fly. The control system is like a central nervous system of the aerial vehicle 10 and may include a plurality of functional modules, such as a flight control system, a tracking system, a path planning system, and other systems with specific functionality, wherein the flight control system includes various types of sensors such as an IMU (Inertial Measurement Unit), a gyroscope, and an accelerometer, and is configured to control the flight attitude of the aerial vehicle 10. The path planning system is configured to plan the flight path of the aerial vehicle 10 depending on the position of the tracked target and instruct the flight control system to control the flight attitude of the aerial vehicle 10 so that the aerial vehicle 10 flies along a designated path. The tracking system includes a vision chip provided in the body 101 and communicatively connected to the lens module 105 mounted on the tripod head 104 via the tripod head 104. The vision chip is configured to determine that the tracked target is identified from media data such as an image or video acquired by the lens module 105, and then generate a corresponding tracking control instruction to control the aerial vehicle 10 in tracking the target.

In some embodiments, the lens module 105 may be placed on the tripod head 104 at any position that facilitates photography.

In some embodiments, the lens module 105 may be mounted directly to the bottom of the body 101.

In some embodiments, the vision chip may also be disposed on the arm 102.

In some embodiments, the vision chip may further control a corresponding lens module 105 to perform photographing according to a photographing instruction sent by the user through the terminal device 20, and transmit photographed images or videos to the terminal device 20 to be displayed on a screen of the terminal device 20.

As shown in FIG. 2, the lens module 105 mounted on the tripod head 104 is communicatively connected to the aerial vehicle 10 through a communication interface 1011 provided in the body 101. When the photographing instruction sent by the user through the terminal device 20 is received, the aerial vehicle 10 generates a control instruction for the corresponding lens module 105 according to the photographing instruction, thereby controlling the corresponding lens module 105 to photograph or film so as to acquire media data such as images or videos. The media data is transmitted to an image processing module 1012 provided in the body 101 through the communication interface 1011; two corresponding paths of media data are generated from the media data processed by the image processing module 1012 by an encoding module 1013 provided in the body 1011, and one path of the media data processed by the encoding module 1013 is output to the image storing module 1014 store the media data locally, and the other path of the media data is output to the terminal device 20 through an image transmitting module 1015 for display on the terminal device 20.

It is to be understood that the tripod head 104 may mount one or more lens module 105 thereon, and each lens module 105 communicates with the aerial vehicle 10 through a corresponding communication interface 1011 on the body 101, or the lens modules 105 share one communication interface 1011 to communicate with the aerial vehicle 10.

If the aerial vehicle 10 can be adapted to a plurality of lens modules 105, it is possible that not all the communication interfaces 1011 provide the exact communication protocol needed for their corresponding lens modules 105 because the lens modules are produced by different manufacturers actually. In other words, different lens modules 105 have to communicate through different communication protocols, the aerial vehicle 10 cannot enable drive control over the lens module 105 if the communication protocol is incorrect. Therefore, the aerial vehicle 10 is further provided with an apparatus for controlling 1018 for acquiring the model data of the lens module 105 so that the corresponding lens module 105 is identified according to the model data of the lens module 105, and thus a corresponding communication protocol is adopted to control the corresponding lens module 105.

As shown in FIG. 3, the lens module 105 includes an 8K lens module 105a, a bifocal lens module 105b, and a one-inch lens module 105c. The communication interface 1011 of the body 101 includes a first communication interface 1011a adapted to the 8K lens module 105a, a second communication interface 1011b adapted to the bifocal lens module 105b, and a third communication interface 1011c adapted to the one-inch lens module 105c.

The apparatus for controlling 1018 is communicatively connected to the communication interface 1011, and information about the lens module 105 adapted to the corresponding communication interface 1011 can be acquired through the corresponding communication interface 1011 so that the lens module 105 is identified and controlled.

Figure 4:
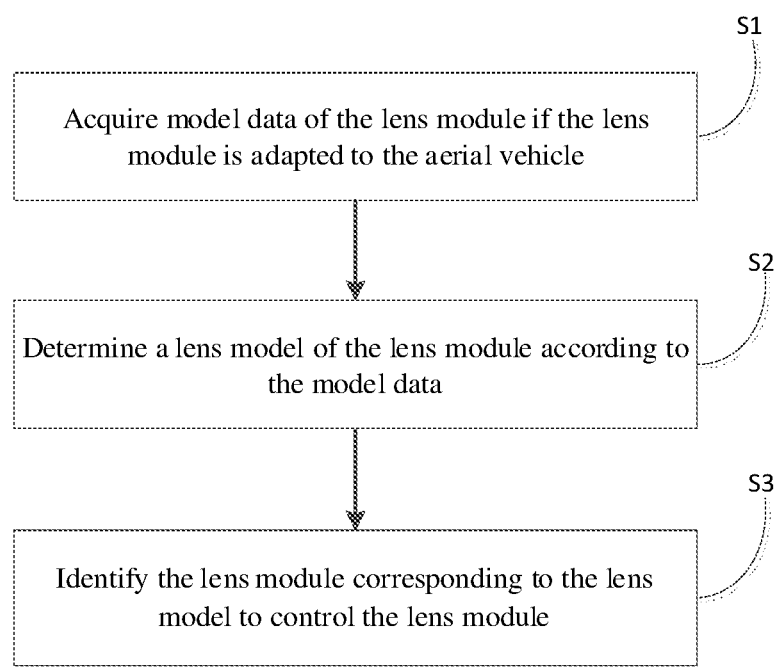
FIG. 4 is a flowchart showing the steps of a method for controlling a lens module according to an embodiment of the present disclosure.

With reference to FIG. 4, the present disclosure provides a method for controlling a lens module, which is applied to the aerial vehicle 10, and the method includes the following steps.

In step S1, model data of the lens module is acquired if the lens module is adapted to the aerial vehicle.

If it's necessary to change the lens module 105 of the aerial vehicle 10, once the user mounts a new lens module 105 onto the tripod head 104 at a corresponding position, the aerial vehicle 10 receives a signal indicating that the lens module 105 is adapted to the aerial vehicle 10 and acquires the model data of the lens module 105.

Figure 5:
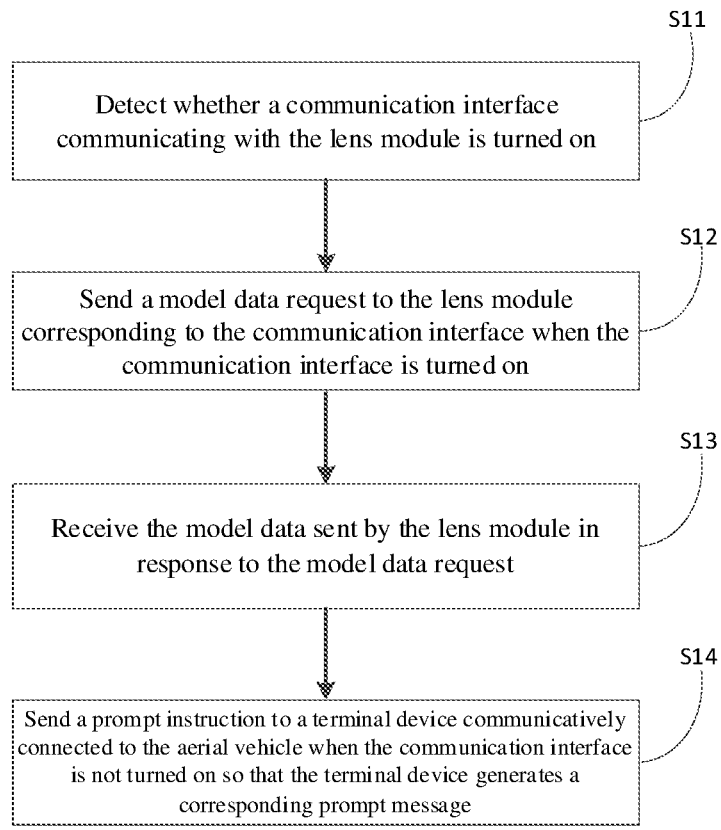
FIG. 5 is a flowchart of sub-steps of step S1 in FIG. 4.

With reference to FIG. 5, in some embodiments, the acquiring model data of the lens module includes:

step S11: detecting whether a communication interface communicating with the lens module is turned on;

step S12: sending a model data request to the lens module corresponding to the communication interface when the communication interface is turned on; and step S13: receiving the model data sent by the lens module in response to the model data request.

The lens module 105 is detachable, and the lens module 105 includes multiple types; different lens modules 105 need different communication interfaces 1011 to be adapted to the aerial vehicle 10; if the communication interface 1011 is adapted to the corresponding lens module 105, the corresponding communication interface 1011 is turned on, and a communicative connection with external devices is enabled.

For example, the lens modules 105 include an 8K lens module 105a, a bifocal lens module 105b, and a one-inch lens module 105c.

The communication interfaces 1011 includes a first communication interface 1011a adapted to the 8K lens module 105a, a second communication interface 1011b adapted to the bifocal lens module 105b, and a third communication interface 1011c adapted to the one-inch lens module 105c.

If the 8K lens module 105a adopts a MIPI protocol to transmit images, then the first communication interface 1011a is a MIPI interface; if the bifocal lens module 105b transmits infrared thermal images through USB and visible light images through MIPI, then the second communication interface 1011b is compatible with MIPI and the USB interfaces; if the one-inch lens module 105c transmits images through an SLVS-EC protocol, then the third communication interface 1011c is an SLVS-EC interface. Therefore, the aerial vehicle 10 is compatible with the MIPI protocol, the USB protocol, and the SLVS-EC protocol.

By detecting whether the communication interface 1011 communicating with the lens module 105 is turned on, the aerial vehicle 10 can learn whether the corresponding communication interface 1011 is loaded with a corresponding external device. When the communication interface is turned on, a model data request is sent to the lens module 105 corresponding to the communication interface 1011, and the model data sent by the lens module 105 in response to the model data request is received so that the corresponding lens module 105 is identified according to the corresponding model data.

Taking the bifocal lens module 105b as an example of the lens module 105, the description is as follows.

The model data of the lens module can also be acquired by detecting, by the aerial vehicle 10, whether the bifocal lens module 105b exists at first. Specifically, whether the second communication interface 1011b can be turned on is detected, and if the result is negative, then the bifocal lens module 105b does not exist.

Even a result that the second communication interface 1011b can be turned on indicates only that there is an external device outside the second communication interface 1011b. A complete confirmation of the existence of the bifocal lens module 105b mounted on the tripod head 104 is subjected to the acquisition of the model data of the bifocal lens module 105b, such as a serial number. If the acquisition of the model data fails or the acquired model data reports an error, for example, the serial number is null, then the bifocal lens module 105b is considered not to exist. If the acquired model data matches the pre-stored model data, then the second communication interface 1011b is loaded with the bifocal lens module 105b.

Similarly, if the lens module 105 is the 8K lens module 105a, the model data of the lens module 105 can also be acquired by detecting, by the aerial vehicle 10, whether the 8K lens module 105a exists at first. Specifically, whether the second communication interface 1011a can be turned on is detected, and if the result is negative, then the 8K lens module 105a does not exist.

Even a result that the second communication interface 1011a can be turned on indicates only that there is an external device outside the second communication interface 1011a. A complete confirmation of the existence of the 8K lens module 105a mounted on the tripod head 104 is subjected to the acquisition of the model data of the 8K lens module 105a, such as a serial number. If the acquisition of the model data fails or the acquired model data reports an error, for example, the serial number is null, then the 8K lens module 105a is considered not to exist. If the acquired model data matches the pre-stored model data, then the second communication interface 1011a is loaded with the 8K lens module 105a.

With reference to FIG. 5, in some embodiments, the method further includes:
step S14: sending a prompt instruction to a terminal device communicatively connected to the aerial vehicle when the communication interface is not turned on so that the terminal device generates a corresponding prompt message.

Herein, the prompt message includes at least one of a voice prompt message, a text prompt message, and a picture prompt message.

For example, if the communication interface 1011 is not turned on, then the corresponding lens module 105 is not mounted on the tripod head 104, or the lens module 105 does not work properly, and at this time, the user shall receive a prompt indicating that the lens module 105 does not work properly.

The prompt may be provided by generating a corresponding prompt instruction and sending the same to the terminal device 20 by the aerial vehicle 10 so that the terminal device 20 generates a corresponding prompt message, wherein the prompt message at least includes one of a voice prompt message, a text prompt message, and a picture prompt message. Therefore, the user can respond timely, for example, to replace the lens module.

In some embodiments, the acquiring model data of the lens module includes:
receiving model information sent by the lens module; and
root-parsing the model information to obtain the model data of the lens module.

For example, when adapted to the aerial vehicle 10, the lens module 105 can actively send the model information of the lens module 105 to the aerial vehicle 10, and the aerial vehicle 10 root-parses the model information and searches for model data of the lens module corresponding to the root-parsed model information from a preset model data library.

In step S2, a lens model of the lens module is determined according to the model data.

The aerial vehicle 10 can acquire the lens model corresponding to the lens module according to the model data and a correlation between the model data and the lens model of the lens module, and further, the aerial vehicle 10 can learn a communication protocol or a drive control program corresponding to the lens module 105 according to the lens model and enable drive control over the lens module 105.

In step S3, the lens module corresponding to the lens model is identified to control the lens module.

In some embodiments, the identifying the lens module corresponding to the lens model to control the lens module includes:
identifying the corresponding lens module according to the lens model, thereby calling a driving control program corresponding to the lens module to control the lens module.

Figure 6:
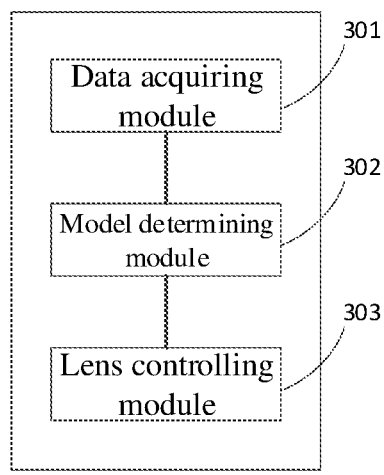
FIG. 6 is a block diagram showing a structure of an apparatus for controlling a lens module according to the present disclosure.

With reference to FIG. 6, the present disclosure further provides an apparatus for controlling a lens module 30, which is applied to the aerial vehicle 10, wherein the apparatus for controlling a lens module 30 includes:
a data acquiring module 301 for acquiring model data of the lens module if the lens module is adapted to the aerial vehicle;
a model determining module 302 for determining a lens model of the lens module according to the model data; and
a lens controlling module 303 for identifying the lens module corresponding to the lens model to control the lens module.

In some embodiments, the data acquiring module 301 is further configured to:
detecting whether a communication interface communicating with the lens module is turned on; and
sending a model data request to the lens module corresponding to the communication interface when the communication interface is turned on.

In some embodiments, the data acquiring module 301 is further configured to:
sending a prompt instruction to a terminal device communicatively connected to the aerial vehicle when the communication interface is not turned on so that the terminal device generates a corresponding prompt message.

Herein, the prompt message includes at least one of a voice prompt message, a text prompt message, and a picture prompt message.

In some embodiments, the data acquiring module 301 is further configured to:
receive model information sent by the lens module; and root-parse the model information to obtain the model data of the lens module.

In some embodiments, the lens controlling module 303 is further configured to:

identify the corresponding lens module according to the lens model, thereby calling a driving control program corresponding to the lens module to control the lens module.

Figure 7:
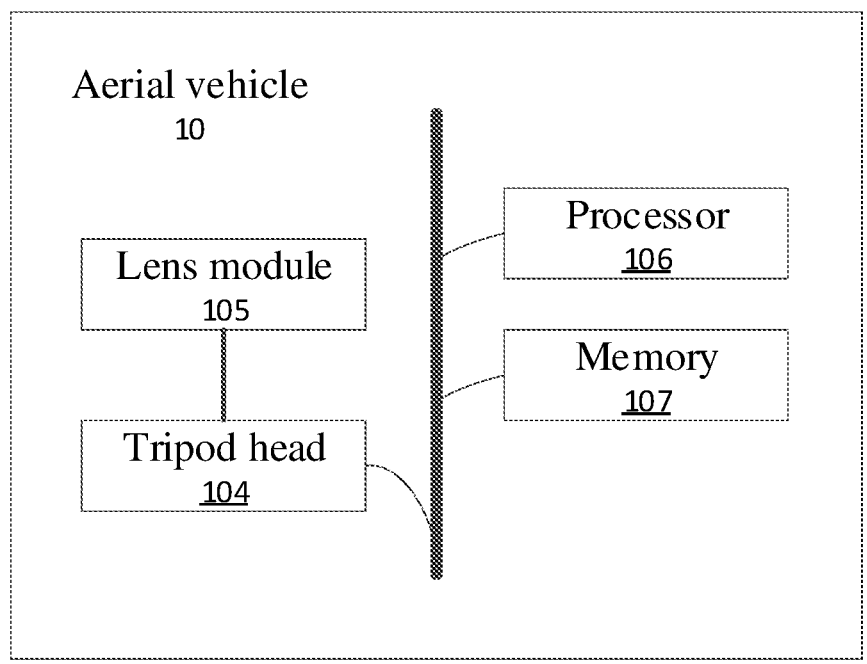
FIG. 7 is a block diagram of an aerial vehicle according to an embodiment of the present disclosure.

With reference to FIG. 7, in some embodiments, the aerial vehicle 10 further includes a processor 106 and a memory 107, the memory 107 being electrically connected to the processor 106.

Herein, the memory 107 includes at least one type of readable storage medium, wherein the readable storage medium includes a flash memory, a hard disk, a multimedia card, a card memory (e.g., SD card or DX), a magnetic memory, a magnetic disk, an optical disk, etc. The memory 107 may in some embodiments be an internal storage unit of the aerial vehicle 10, such as a hard disk of the aerial vehicle 10. The memory 107 may also be an external storage device of the aerial vehicle 10 in other embodiments, such as a plug-in hard disk, a Smart Media Card (SMC), a Secure Digital (SD) card, and a flash Card provided on the aerial vehicle 10. The memory 107 may be configured not only to store application software installed in the aerial vehicle 10 and various types of data, such as codes of a computer-readable method for controlling program, but also to temporarily store data that has been output or is to be output.

The processor 106 may be a Central Processing Unit (CPU), a controller, a micro-controller, a micro-processor or other data processing chip in some embodiments, and the processor 106 may call the program or process the data stored in the memory 107 to perform the following steps of the method for controlling, which include:

acquiring model data of the lens module if the lens module is adapted to the aerial vehicle;

determining a lens model of the lens module according to the model data; and identifying the lens module corresponding to the lens model to control the lens module.

In some embodiments, the processor 106 is further configured to perform the following steps of the method for controlling, which include:

detecting whether a communication interface communicating with the lens module is turned on;

sending a model data request to the lens module corresponding to the communication interface when the communication interface is turned on; and receiving the model data sent by the lens module in response to the model data request.

In some embodiments, the processor 106 is further configured to perform the following steps of the method for controlling, which include:

sending a prompt instruction to a terminal device communicatively connected to the aerial vehicle when the communication interface is not turned on so that the terminal device generates a corresponding prompt message;

wherein the prompt message includes at least one of a voice prompt message, a text prompt message, and a picture prompt message.

In some embodiments, the processor 106 is further configured to perform the following steps of the method for controlling, which include:

receiving model information sent by the lens module; and root-parsing the model information to obtain the model data of the lens module.

In some embodiments, the processor 106 is further configured to perform the following steps of the method for controlling, which include:

identifying the corresponding lens module according to the lens model, thereby calling a driving control program corresponding to the lens module to control the lens module.

The present disclosure further provides a storage medium, wherein the storage medium stores a computer-executable control program, and the processor calls the control program to perform the aforementioned method for controlling.

The above are only preferred embodiments of the present disclosure and are not intended to limit the scope of the present disclosure. Any equivalent structural or procedural transformation based on the description and drawings of the present disclosure and applied directly or indirectly in other related technical fields similarly fall within the scope of the present disclosure.

The invention claimed is:

1. A method for controlling a lens module, which is applied to an aerial vehicle, the aerial vehicle being provided with a tripod head to mount a lens module thereon, the method comprising:

acquiring model data of the lens module if the lens module is adapted to the aerial vehicle;

determining a lens model of the lens module according to the model data;

searching for model data of the lens module corresponding to the root-parsed model information from a preset model data library; and identifying the lens module corresponding to the lens model to control the lens module, wherein the acquiring model data of the lens module comprises:

detecting whether a communication interface communicating with the lens module is turned on;

sending a model data request to the lens module corresponding to the communication interface when the communication interface is turned on.

2. The method for controlling according to claim 1, wherein the acquiring model data of the lens module further comprises:

receiving the model data sent by the lens module in response to the model data request.

3. The method for controlling according to claim 2, further comprising:

sending a prompt instruction to a terminal device communicatively connected to the aerial vehicle when the communication interface is not turned on so that the terminal device generates a corresponding prompt message.

4. The method for controlling according to claim 3, wherein the prompt message comprises at least one of a voice prompt message, a text prompt message or a picture prompt message.

5. The method for controlling according to claim 1, wherein the acquiring model data of the lens module comprises:

receiving model information sent by the lens module; and root-parsing the model information to obtain the model data of the lens module.

6. The method for controlling according to claim 1, wherein the identifying the lens module corresponding to the lens model to control the lens module comprises:

identifying the corresponding lens module according to the lens model, thereby calling a driving control program corresponding to the lens module to control the lens module.

7. An aerial vehicle, the aerial vehicle comprising a body, arms connected to the body, a power apparatus provided on the arm, and a tripod head connected to the body, wherein the tripod head is configured to mount a lens module thereon, and the aerial vehicle further comprises:
- a memory and one or more processors;
- wherein the memory is configured to store a computer-executable control program;
- the one or more processors are configured to call the computer-executable control program to:
- acquire model data of the lens module if the lens module is adapted to the aerial vehicle;
- search for model data of the lens module corresponding to the root-parsed model information from a preset model data library;
- determine a lens model of the lens module according to the model data; and
- identify the lens module corresponding to the lens model to control the lens module, wherein the one or more processors are further configured to:
- detect whether a communication interface communicating with the lens module is turned on;
- send a model data request to the lens module corresponding to the communication interface when the communication interface is turned on.

8. The aerial vehicle according to claim 7, wherein the one or more processors are further configured to:
- receive the model data sent by the lens module in response to the model data request.

9. The aerial vehicle according to claim 8, wherein the one or more processors are further configured to:
- send a prompt instruction to a terminal device communicatively connected to the aerial vehicle when the communication interface is not turned on so that the terminal device generates a corresponding prompt message.

10. The aerial vehicle according to claim 9, wherein the prompt message comprises at least one of a voice prompt message, a text prompt message or a picture prompt message.

11. The aerial vehicle according to claim 7, wherein the one or more processors are further configured to:
- receive model information sent by the lens module; and
- root-parse the model information to obtain the model data of the lens module.

12. The aerial vehicle according to claim 7, wherein the one or more processors are further configured to:
- identify the corresponding lens module according to the lens model, thereby calling a driving control program corresponding to the lens module to control the lens module.

13. An aircraft system, the aircraft system comprising an aerial vehicle and a terminal device communicatively connected to the aerial vehicle, the aerial vehicle comprising a body, arms connected to the body, a power apparatus provided on the arm, and a tripod head connected to the body, wherein the tripod head is configured to mount a lens module thereon, and the aerial vehicle further comprises:
- a memory and one or more processors;
- wherein the memory is configured to store a computer-executable control program;
- the one or more processors are configured to call the computer-executable control program to: acquire model data of the lens module if the lens module is adapted to the aerial vehicle;
- determine a lens model of the lens module according to the model data;
- search for model data of the lens module corresponding to the root-parsed model information from a preset model data library; and
- identify the lens module corresponding to the lens model to control the lens module, wherein the one or more processors are further configured to:
- detect whether a communication interface communicating with the lens module is turned on;
- send a model data request to the lens module corresponding to the communication interface when the communication interface is turned on.

14. The aircraft system according to claim 13, wherein the one or more processors are further configured to:
- receive the model data sent by the lens module in response to the model data request.

15. The aircraft system according to claim 14, wherein the one or more processors are further configured to:
- send a prompt instruction to a terminal device communicatively connected to the aerial vehicle when the communication interface is not turned on so that the terminal device generates a corresponding prompt message.

16. The aircraft system according to claim 15, wherein the prompt message comprises at least one of a voice prompt message, a text prompt message or a picture prompt message.

17. The a aircraft system according to claim 13, wherein the one or more processors are further configured to:
- receive model information sent by the lens module; and
- root-parse the model information to obtain the model data of the lens module.

18. The aircraft system according to claim 13, wherein the one or more processors are further configured to:
- identify the corresponding lens module according to the lens model, thereby calling a driving control program corresponding to the lens module to control the lens module.

* * * * *